United States Patent
Solpietro et al.

(10) Patent No.: US 9,506,837 B2
(45) Date of Patent: Nov. 29, 2016

(54) TORIC INTRAOCULAR LENS MEASUREMENT APPARATUS AND METHOD

(71) Applicant: Lumetrics, Inc., Rochester, NY (US)

(72) Inventors: John Solpietro, Spencerport, NY (US); David Compertore, Penfield, NY (US); Michael A. Marcus, Honeoye Falls, NY (US)

(73) Assignee: Lumetrics, Inc., Rochester, NY (US)

( * ) Notice: Subject to any disclaimer, the term of this patent is extended or adjusted under 35 U.S.C. 154(b) by 405 days.

(21) Appl. No.: 14/254,831

(22) Filed: Apr. 16, 2014

(65) Prior Publication Data

US 2015/0297401 A1  Oct. 22, 2015

(51) Int. Cl.
*G01M 11/00* (2006.01)
*G01M 11/02* (2006.01)

(52) U.S. Cl.
CPC ..... *G01M 11/0214* (2013.01); *G01M 11/0278* (2013.01)

(58) Field of Classification Search
None
See application file for complete search history.

(56) References Cited

U.S. PATENT DOCUMENTS

| | | | |
|---|---|---|---|
| 5,936,720 A | 8/1999 | Neal | |
| 6,130,419 A | 10/2000 | Neal | |
| 6,486,943 B1 * | 11/2002 | Burns | A61B 3/1015 356/124 |
| 6,724,487 B2 | 4/2004 | Marcus et al. | |
| 7,583,389 B2 | 9/2009 | Neal et al. | |
| 7,623,251 B2 | 11/2009 | Neal et al. | |

OTHER PUBLICATIONS

R. R. Rammage et al., "Advanced Characterization Techniques for Optical, Semiconductor, and Data Storage Components," Proc. SPIE vol. 4779, pp. 161-172, (2002). EFS file name 20140604__14-254831__IDS__NPL__Cite1.

D.R. Neal et al., "Measurement of lens focal length using multi-curvature analysis of Shack-Hartmann wavefront data", Proc. of SPIE vol. 5523, pp. 243-255, (2004). EFS file name 20140604__14-254831__IDS__NPL__Cite2.

G.W.Forbes, "Characterizing the shape of freeform optics," Optics Express, vol. 20 No. 3, pp. 2483-2499, Jan. 30, 2012, US. EFS file name 20140604__14-254831__IDS__NPL__Cite3.

D.R.Neal et al., "Wavefront Sensors for control and process monitoring in optics manufacture.," SPIE, vol. 2993, pp. 211-220, Mar. 27, 1997, San Jose CA, US. EFS file name 20140604__14-254831__IDS__NPL__Cite4.

R. R. Rammage et al., "Application of Shack-Hartmann wavefront sensing technology to transmissive optic metrology," SPIE 2002

(Continued)

*Primary Examiner* — Kara E Geisel
*Assistant Examiner* — Amanda Merlino
(74) *Attorney, Agent, or Firm* — John M. Hammond; Patent Innovations LLC

(57) ABSTRACT

An apparatus for determining the angular error in the placement of fiducial marks on a toric intraocular lens with respect to the true location of a meridional axis of the intraocular lens, the fiducial marks defining an estimate of the angular orientation of the meridional axis of the intraocular is disclosed. The apparatus includes a rotatable intraocular lens holder coupled to drive assembly and an actuator which are mounted into an optical measurement cell receptacle of a wavefront measuring instrument or an angular error measuring instrument. A method for determining the angular error in the placement of fiducial marks on a toric intraocular lens with respect to the true location of a meridional axis of the intraocular lens is also disclosed.

22 Claims, 11 Drawing Sheets

(56) References Cited

OTHER PUBLICATIONS 4779-27, pp. 1-12, Aug. 5, 2002, US. EFS file name 20140604_14-254831_IDS_NPL_Cite5.

C.R.Forest etr al., "Metrology of thin transparent optics using Shack-Hartmann wavefront sensing," Opt. Eng. 43(3) 742-753, SPIE, (Mar. 2004), US. EFS file name 20140604_14-254831_IDS_NPL_Cite6.

Specification and drawings of commonly owned copending U.S. Appl. No. 13/794,577, "Apparatus and Method for Evaluation of Optical Elements," EFS file name 20140604_14-254831_IDS_NPL_Cite7.

* cited by examiner

TORIC INTRAOCULAR LENS MEASUREMENT APPARATUS AND METHOD

CROSS-REFERENCE TO RELATED APPLICATIONS

Reference is made to commonly-assigned co-pending U.S. patent application Ser. No. 13/794,577, which has a filing date of Mar. 11, 2013, the disclosure of which is incorporated herein as reference.

BACKGROUND

1. Technical Field

The present invention relates to the metrology of optical elements, and in particular, to the metrology of intraocular lenses (IOL).

2. Description of the Related Art

Intraocular lenses have been developed to be implanted in the eye to replace the lens containing cataracts in the eye. During cataract surgery, the capsular bag is cleared of all remnants of the cloudy or damaged biological lens, making space for the insertion of an IOL. In order to properly assess the manufacturing process of intraocular lenses (IOL), the lenses must be measured in a solution which simulates the natural conditions found in the human eye. Solutions employed to measure the IOL's are diverse, from surgical saline to simple deionized water. To conserve solution, control the risk of contamination, and control cost, a minimum amount of solution is used in each measurement. The resulting measurement vessel, known as a cuvette, holds the IOL in its measurement solution in a confined space with limited accessibility.

Toric lens implants are commonly implanted when a patient has significant corneal astigmatism. An integral part of the procedure is to rotate the IOL into the correct position to correct the steep cornea at that meridian. A toric lens has two different optical powers aligned along two meridians on the face of the lens. The meridians are called the steep and shallow meridians and they are perpendicular to each other. IOL manufacturers add fiducial or alignment marks to the IOL, which indicate the expected meridian axis of least power (shallow meridian, also known as the shallow meridian cylinder axis).

When performing optical power and aberration measurement of an IOL, it is desirable to have its cylinder axis oriented in the proper relationship to the measurement system's angular coordinate axis. Often it is advantageous to physically rotate the IOL inside a cuvette during measurement of optical power. Alternatively reorienting the measurement system's angular coordinate axis can be done in software, but at a loss in accuracy.

A wavefront sensor is a device for measuring the optical aberrations of an optical wavefront. This is accomplished by measuring the irradiance and phase distribution of the light beam at a particular plane in space. Although there are a variety of wavefront sensing technologies, including lateral shearing interferometers, curvature sensors, pyramid wavefront sensors, Focault knife-edge test, Ronchi test, and Shack-Hartmann Wavefront Sensor (SHWFS), the SHWFS has been the most frequently employed, since it is capable of measuring both irradiance and phase distributions in a single frame of data.

U.S. Pat. No. 5,936,720 by Daniel R. Neal et al. entitled "Beam Characterization By Wavefront Sensor" issued on Aug. 10, 1999, and U.S. Pat. No. 6,130,419 by Daniel R. Neal entitled "Fixed Mount Wavefront Sensor" issued on Oct. 10, 2000 describe the basics principles of operations of a wavefront sensor employing a two dimensional Shack-Hartmann lenslet array; the disclosures of these patents are incorporated herein by reference. Further details on the use of Shack-Hartmann wavefront sensors in optical metrology may be found in "Application of Shack-Hartmann wavefront sensing technology to transmissive optic metrology" by R. R. Rammage et al., Proc. SPIE Vol. 4779, Advanced Characterization Techniques for Optical, Semiconductor, and Data Storage Components, pp. 161-172, (2002).

U.S. Pat. No. 7,583,389 by Daniel R. Neal et al. entitled "Geometric Measurement System and Method of Measuring a Geometric Characteristic of an Object" issued on Sep. 1, 2009, describes a white light interferometer to measure surface curvature and or thickness of an object. This patent discloses the requirement of tilting of the object with respect to the interferometer apparatus and measuring at a variety of tilt angles in order to characterize a single surface of the object. The disclosure of this patent is incorporated herein by reference.

U.S. Pat. No. 7,623,251 by Daniel R. Neal et al. entitled "Geometric Measurement System And Method Of Measuring A Geometric Characteristic Of An Object" issued on Nov. 24, 2009 describes the use of wavefront sensing to measure surface curvature of an object on one or more surfaces. The measurement requires moving the object relative to the measurement apparatus and measuring at a variety of positions and/or angles in order to characterize the curvature of the one or more surfaces. The disclosure of this patent is incorporated herein by reference.

FIG. 1 depicts a plan view of a toric IOL 22. The optical portion of the IOL 22 lies within the outer diameter 37 of the IOL 22. The haptics 31 function as spacers to center the IOL 22 into the capsular bag of the human eye. The outer diameter 37 of the IOL is large enough to form a good image onto the retina, but too small to fill the capsular bag. The haptics 31 take up the empty space in the capsular bag, thereby centering the IOL 22 into the capsular bag and holding the capsular bag open during healing. The eye is stable once healing is complete.

During the manufacturing process of the IOL 22, fiducial marks 28 are formed onto the surface of the IOL 22 and co-aligned with the expected direction of the shallow meridian cylinder axis 26. The straight line drawn between the fiducial marks 28 shown in FIG. 1 is called the marked shallow meridian (cylinder) axis 26. This line indicates to the surgeon where the shallow meridian cylinder axis of the IOL 22 is expected to be located. The shallow meridian axis 26 defines the line having the lowest optical power of the IOL 22. The expected steep meridian axis 27 is perpendicular to the marked shallow meridian axis 26 as shown in FIG. 1. The intersection of the steep meridian axis 27 and the shallow meridian axis 26 at the surface of the intraocular lens defines the location of the optical axis 29 of the IOL 22 which is orthogonal to both meridian axes.

Depicted in FIG. 2 is a possible manufacturing defect in a toric IOL 22 in which there is a misalignment of the fiducial marks 28 with respect the true location of the shallow meridian axis of IOL 22 represented by dashed line 42. The angular misalignment between the marked shallow meridian axis 26 and the true shallow meridian cylinder axis 42 is represented by misalignment angle 39 in FIG. 2.

During cataract surgery, in a case where the cataract patient has a natural astigmatic cornea, the cataract surgeon implants an IOL 22 with a prescribed amount of cylinder, which neutralizes the corneal astigmatism. The surgeon rotates the IOL 22 taking great care aligning the fiducial marks, 28, with the cylinder axis of the of the patient's cornea, which has been marked in a pre-surgery process. The cylinder added to the IOL corrects the patient's defective cornea. The lower power meridian of the IOL 22 is aligned to the high power of the patient's cornea to balance and even out the patient's corneal astigmatism. Any source of misalignment between the patient's corneal steep meridional cylinder axis and the IOUs shallow meridian axis 42 decreases the effectiveness of the IOL cylinder correction and results in a less than optimal visual outcome for the patient. The surgeon solely relies upon the fiducial marks 28 during surgery and cannot compensate for inherent IOL cylinder axis alignment errors. Therefore it is critical to measure, understand and minimize alignment errors between the fiducial marks and the true location of the shallow meridional cylinder axis 42 of the IOL 22 during manufacturing and prior to surgery. In effect, the misalignment angle 39 should be measured during the manufacturing of the IOL 22 to ensure its contribution to a patient's visual outcome is negligible.

The disclosures of these patents notwithstanding, there remains an unmet need for determining the orientation of fiducial marks placed on a toric intraocular lens with respect to the true location of the shallow meridional axis of the IOL so that the ophthalmic surgeon can properly orient the IOL during surgery before implanting in a patients eye. There is also a need for an apparatus and method that enables the measurement of the transmitted wavefront of a non-axially symmetric lens or other optical element at the proper rotation such that the measurement axis of the wavefront sensor is co-aligned with an optical meridian axis of the optical element under test. Such a capability will enable improved measurement of the physical dimensions and optical performance parameters of multifocal and toric lenses.

SUMMARY

The present invention meets this need by providing an apparatus which allows a user to rotate an IOL about its optical axis in order to align the fiducial marks on the lens with a principal axis of an angular error measuring instrument while installed into the measurement region of the measuring instrument. The instrument then measures the alignment angular error of the fiducial marks with respect to the principal axis of the instrument.

This invention also allows for the rotation of an IOL under test inside a cuvette without removing and replacing the cuvette into the measurement apparatus. This minimizes the amount of centering after the rotation is complete and minimizes the amount of time required to perform a rotation. Prior to this invention, rotation inside a cuvette was achieved by inserting a foreign object into the cuvette to manipulate the IOL into rotating. This invention eliminates the need to insert such objects and decreases the chance of contamination, and also decreases the chance of damaging the IOL with the manipulator during rotation.

This invention also allows for quantification of the amount of rotation without the use of machine vision algorithms. This invention does not preclude the use of machine vision, as the IOL remains visible. Combining this invention with machine vision increases the functionality of the measurement system as a whole.

This invention also allows for the measurement of the IOL in any fluid environment including saline solution, deionized water or air. The IOL can be measured in the same location mounted in the cuvette with different fluids being present without changing the rotational alignment of the IOL. Optionally, it can be removed from the saline environment and re-mounted into a new or the same measurement system to be measured in air. Wet and dry measurement data can be compared without requiring compensation for realignment of the sample. Maintaining the same rotational alignment between different measurement equipment and different states of measurement environments is a key advance allowed by this invention. Comparing wet and dry measurement data can be required in the development and manufacture of IOL's.

In a first embodiment of the invention, an apparatus for determining the angular error in the placement of fiducial marks on an intraocular lens with respect to the true location of a meridional axis of the intraocular lens is provided. The fiducial marks define an estimate of the angular orientation of the meridional axis of the intraocular lens. The apparatus comprises a rotatable intraocular lens holder adapted to mount the intraocular lens and rotate the intraocular lens about its optical axis and coupled to a drive assembly adapted to rotate the intraocular lens mounted in the rotatable intraocular lens holder without changing the location of the optical axis. The apparatus also comprises an optical measurement cell for holding the intraocular lens mounted into the rotatable intraocular lens holder, and an optical measurement cell receptacle for receiving the optical measurement cell and its contents. The apparatus further comprises a wavefront measuring instrument having a principal axis defining a fixed coordinate system.

The wavefront measuring instrument further comprises a light source and a sensor. The light source is configured to emit a beam of light directed along an illumination axis passing through the optical measurement cell receptacle and its contents and onto the sensor. The wavefront measuring instrument is adapted to measure wavefront deviations due to the presence of the intraocular lens.

The apparatus further comprises an optical feedback sensor configured to view the orientation of the fiducial marks on the intraocular lens with respect to the principal axis of the wavefront measuring instrument. In addition, the apparatus comprises an actuator coupled to the drive assembly for rotating the intraocular lens about its optical axis so that the fiducial marks of the intraocular lens are aligned with the principal axis of the wavefront measuring instrument using the optical feedback sensor. The apparatus further comprises a processor including an algorithm executable to process the wavefront deviations due to the presence of the intraocular lens in the optical measurement cell receptacle and to calculate the angular error in the placement of the fiducial marks with respect to the true location of the meridional axis of the intraocular lens.

In accordance with the invention, a method for determining the angular error in the placement of fiducial marks on an intraocular lens with respect to the true location of a meridional axis of the intraocular lens is also provided. The fiducial marks define an estimate of the angular orientation of the meridional axis of the intraocular lens. The method comprises the steps of providing a rotatable intraocular lens measurement fixture comprising an actuator coupled to a drive assembly, which is coupled to a rotatable intraocular lens holder adapted to rotate the intraocular lens about its optical axis without changing the location of the optical axis; and mounting the intraocular lens into the rotatable intraocular lens holder of the rotatable intraocular lens measurement fixture. The method also includes the steps of inserting the intraocular lens mounted in the rotatable intraocular lens measurement fixture into a measurement cell. The method further comprises providing a wavefront measuring instrument having a principal axis defining a fixed coordinate system. The wavefront measuring instrument comprises a light source, a measurement cell receptacle located in a measurement region of the instrument, and a sensor. The light source is configured to emit a beam of light directed along an illumination axis so that the beam of light passes through the optical measurement cell receptacle and its contents, and onto the sensor. The wavefront measuring instrument is adapted to measure wavefront deviations due to the presence of the intraocular lens. The method also includes the steps of inserting the measurement cell and its contents into a measurement cell receptacle of the wavefront measuring instrument, adjusting the location of the optical axis of the intraocular lens so that it is collinear with the illumination axis of the wavefront measuring instrument, and adjusting the actuator to rotate the intraocular lens so that the fiducial marks on the lens are aligned with the principal axis of the wavefront measuring instrument. The method further includes obtaining measurement data by performing a measurement of the wavefront deviations due to the presence of the intraocular lens using the wavefront measuring instrument and calculating the angular error in the placement of the fiducial marks on the intraocular lens with respect to the true location of the meridional axis of the intraocular lens from the measurement data.

In a further embodiment of the invention, an apparatus for determining the angular error in the placement of fiducial marks on an intraocular lens with respect to the true location of a meridional axis of the intraocular lens is provided. The fiducial marks define an estimate of the angular orientation of a meridional axis of the intraocular lens. The apparatus comprises a rotatable intraocular lens holder adapted to mount the intraocular lens and rotate the intraocular lens about its optical axis. The apparatus also comprises a drive assembly coupled to the rotatable intraocular lens holder and adapted to rotate the intraocular lens mounted in the rotatable intraocular lens holder without changing the location of the optical axis. The apparatus further comprises an optical measurement cell for holding the intraocular lens mounted into the rotatable intraocular lens holder and an optical measurement cell receptacle for receiving the optical measurement cell and its contents. The apparatus also comprises an angular error measuring instrument having a principal axis defining a fixed coordinate system, the angular error measuring instrument further comprising a light source and a sensor. The light source is configured to emit a beam of light directed along an illumination axis which passes through the optical measurement cell receptacle and its contents, and onto the sensor. The apparatus further comprises an optical feedback sensor to view the orientation of the fiducial marks on the intraocular lens with respect to the principal axis of the angular error measuring instrument. The apparatus also comprises an actuator coupled to the drive assembly for rotating the intraocular lens about its optical axis so that the fiducial marks of the intraocular lens are coincident with the principal axis of the angular error measuring instrument, using the optical feedback sensor. The apparatus further comprises a processor including an algorithm executable to process data obtained from the sensor to determine the angular error in the placement of the fiducial marks with respect to the true location of the meridional axis of the intraocular lens These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present disclosure will be provided with reference to the following drawings, in which like numerals refer to like elements, and in which.

Figure 1:
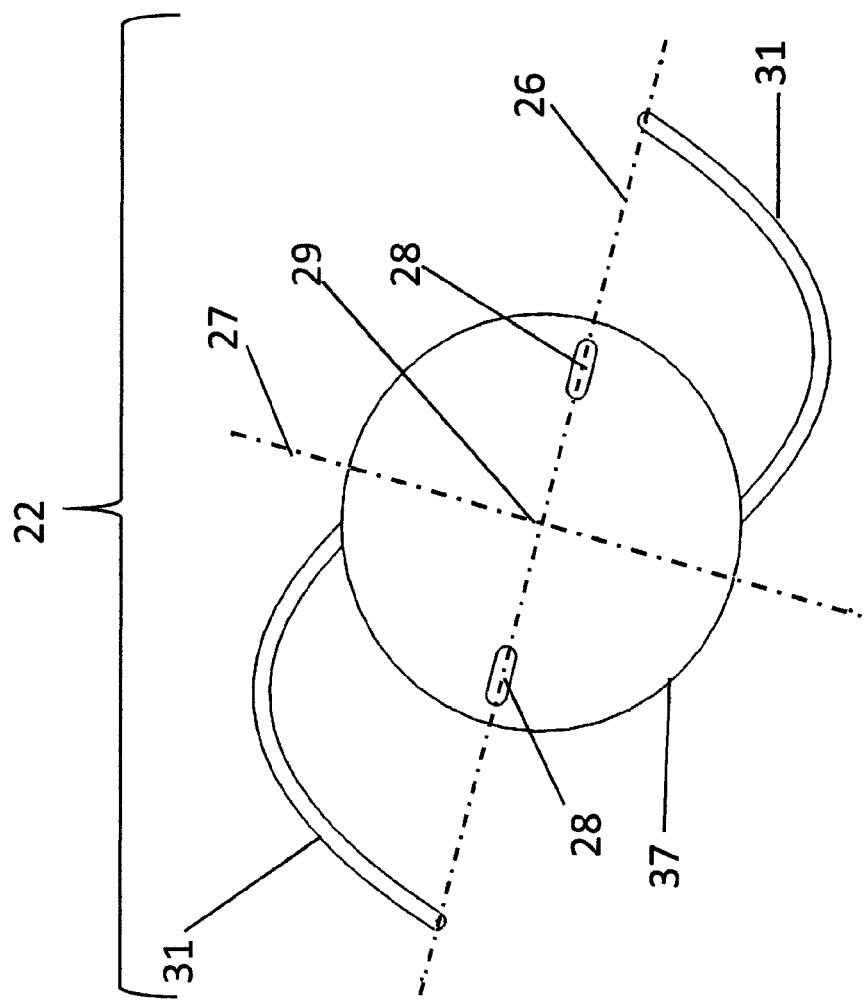
FIG. 1 shows a plan view of a toric IOL.

The present invention will be described in connection with preferred embodiments; however, it will be understood that there is no intent to limit the invention to the embodiments described. On the contrary, the intent is to cover all alternatives, modifications, and equivalents as may be included within the spirit and scope of the invention as defined by this specification, drawings and appended claims.

DETAILED DESCRIPTION

The present description is directed in particular to elements forming part of, or cooperating more directly with, apparatus in accordance to the invention. For a general understanding of the present invention, reference is made to the drawings. It is to be understood that elements not specifically shown or described may take various forms well known to those skilled in the art. In the following description and drawings, identical reference numerals have been used, where possible, to designate identical elements.

The example embodiments of the present invention are illustrated schematically in order to illustrate key principles of operation of the present invention and are not drawn with intent to show actual size or scale. Some exaggeration, i.e., variation in size or scale may be necessary in order to emphasize relative spatial relationships or principles of operation. One of ordinary skill in the art will be able to readily determine the specific size and interconnections of the elements of the example embodiments of the present invention.

In the following disclosure, the present invention is described in the context of its use as an apparatus and method for determining the angular error in the placement of fiducial marks on a toric intraocular lens with respect to the true location of a meridional axis of the intraocular lens. However, it is not to be construed as being limited only to use in toric intraocular lens measurement. The invention is adaptable to other uses for measurement of angular error in the location of fiducial marks of other types of lenses including contact lenses and cylindrical lenses. Additionally, this description may identify certain components with the adjectives "top," "upper," "bottom," "lower," "left," "right," "horizontal", "vertical" etc. These adjectives are provided in the context of use of the apparatus as a lens measurement device, and in the context of the orientation of the drawings, which is arbitrary. The description is not to be construed as limiting the apparatus to use in a particular spatial orientation. The instant apparatus may be used in orientations other than those shown and described herein.

Figure 3:
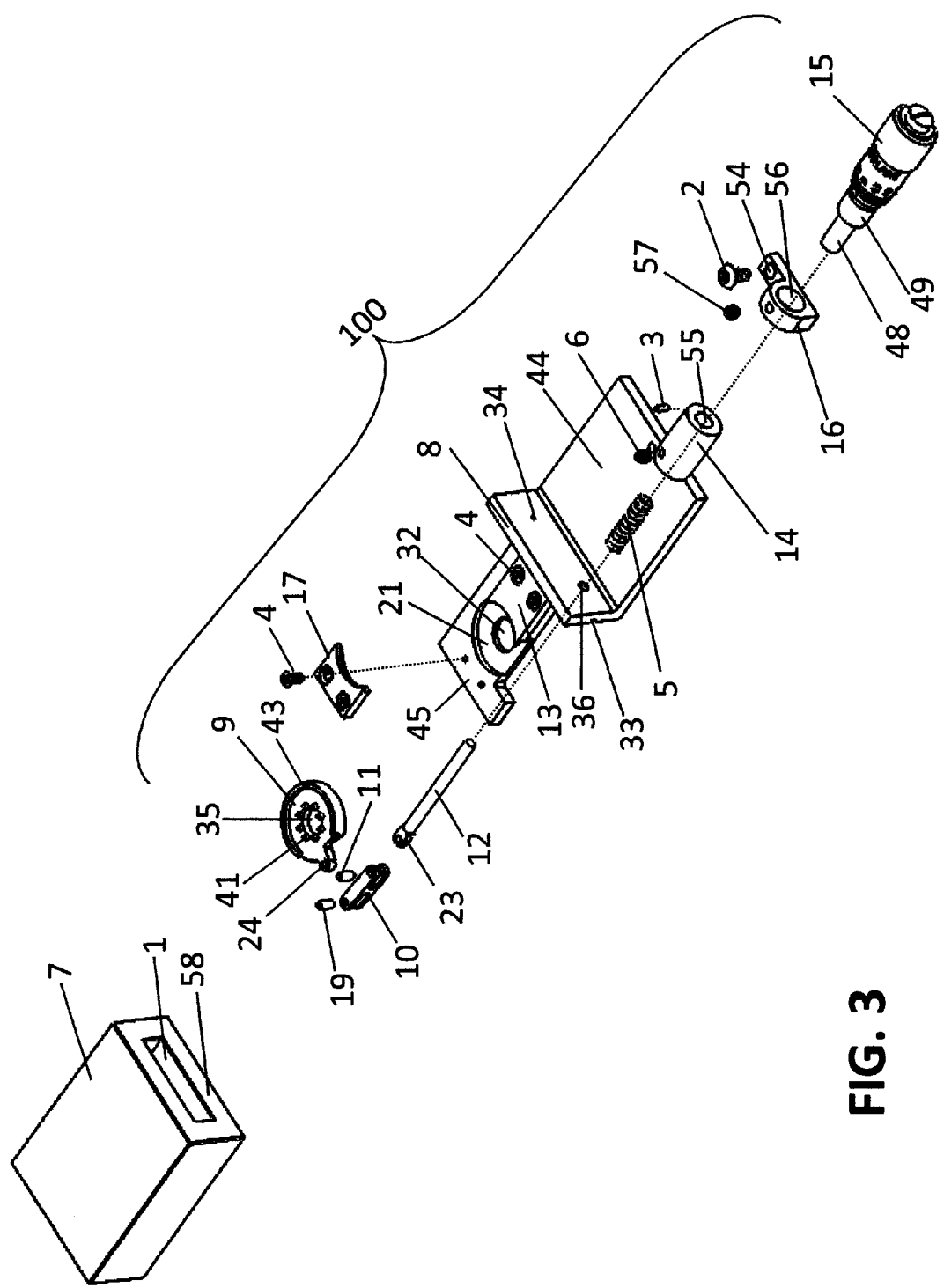
FIG. 3 shows an exploded perspective view of an IOL rotator measurement fixture with measurement cell.
Figure 4:
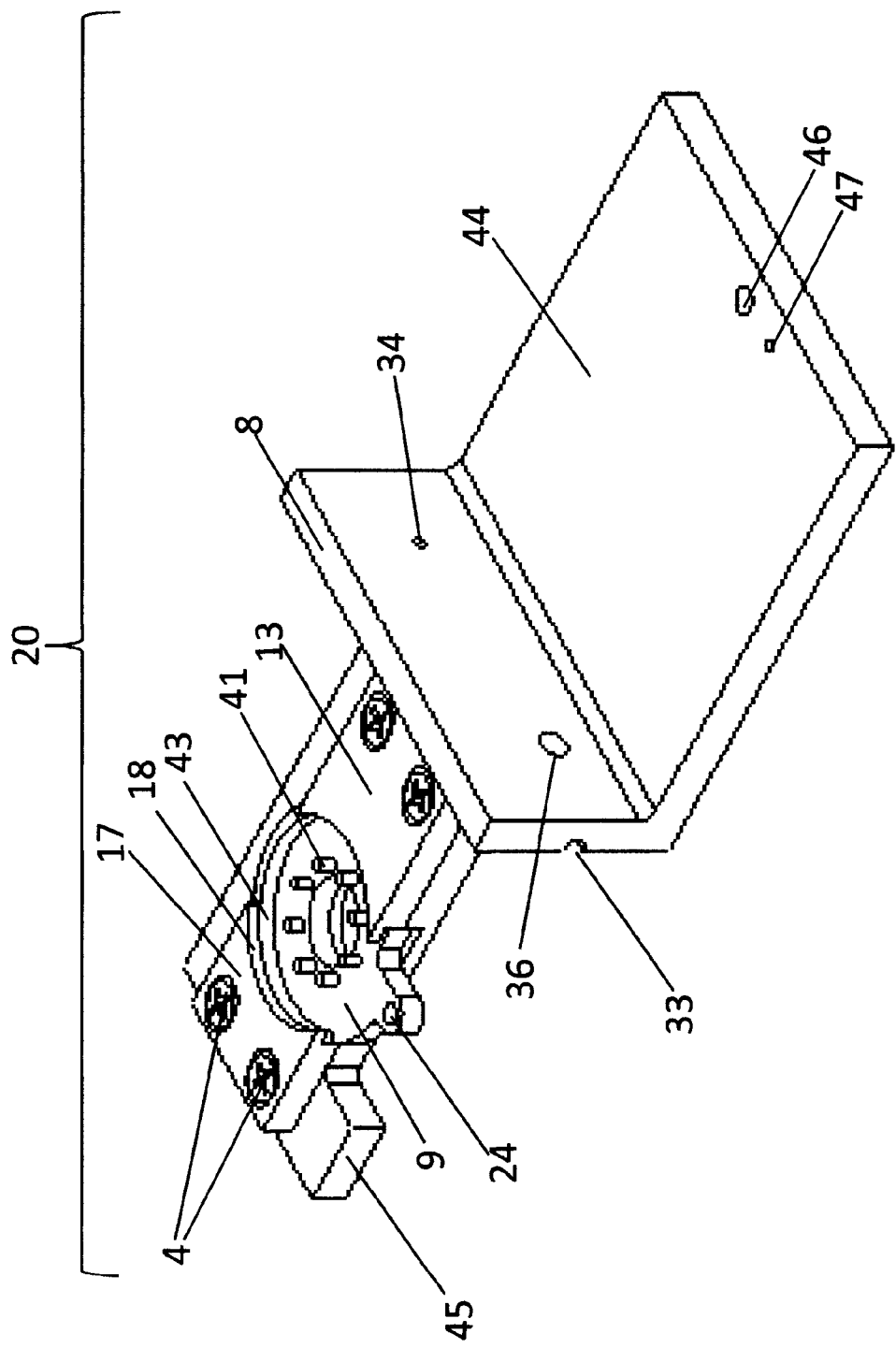
FIG. 4 shows a perspective view of an assembled IOL holder.
Figure 5:
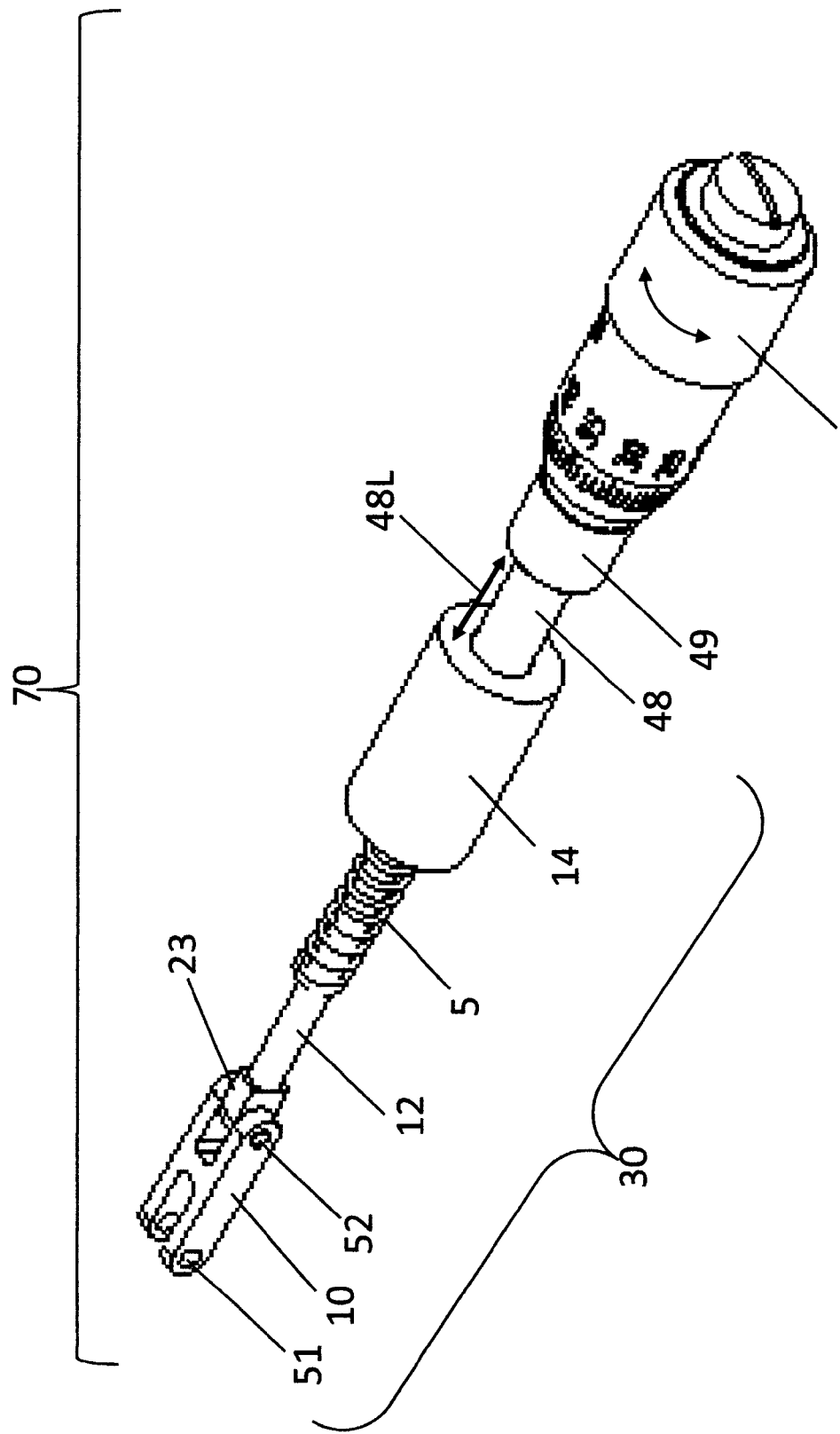
FIG. 5 shows a perspective view of an assembled IOL drive assembly with an actuator.
Figure 6:
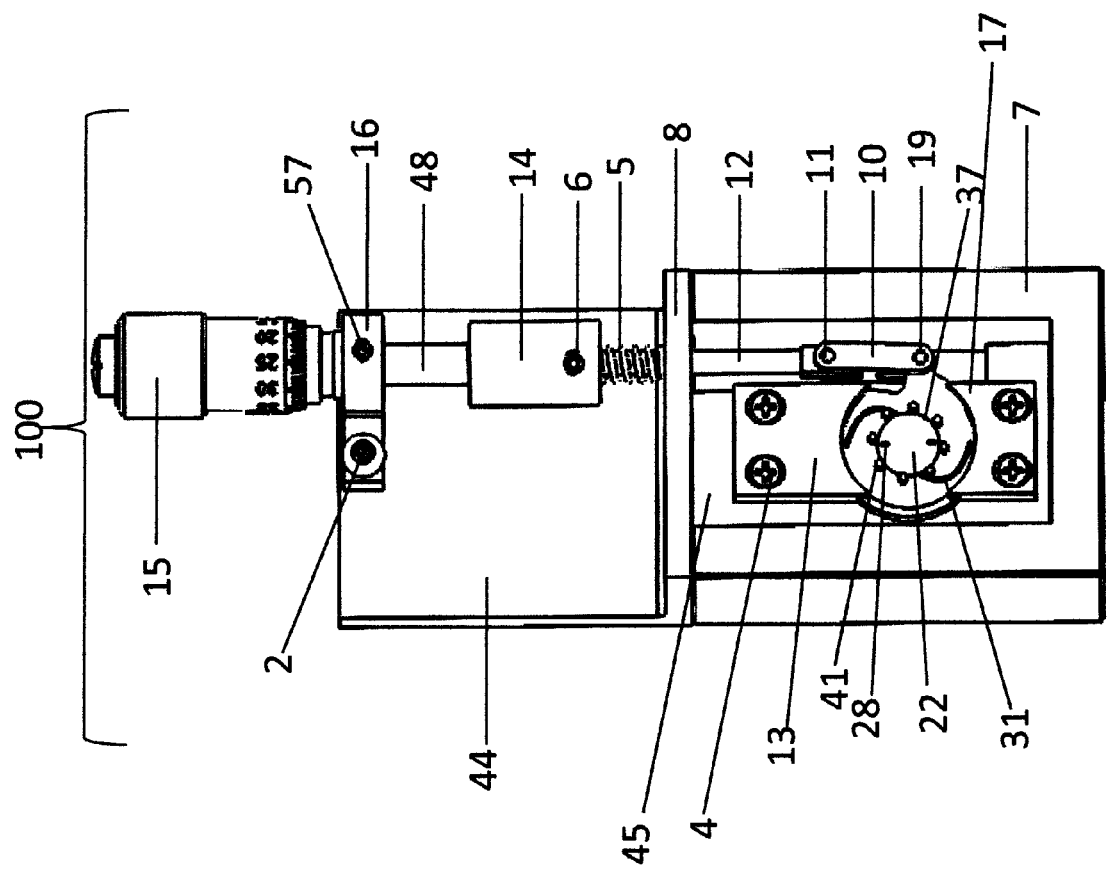
FIG. 6 shows a plan view of an assembled IOL rotator measurement fixture mounted in a measurement cell.
Figure 7:
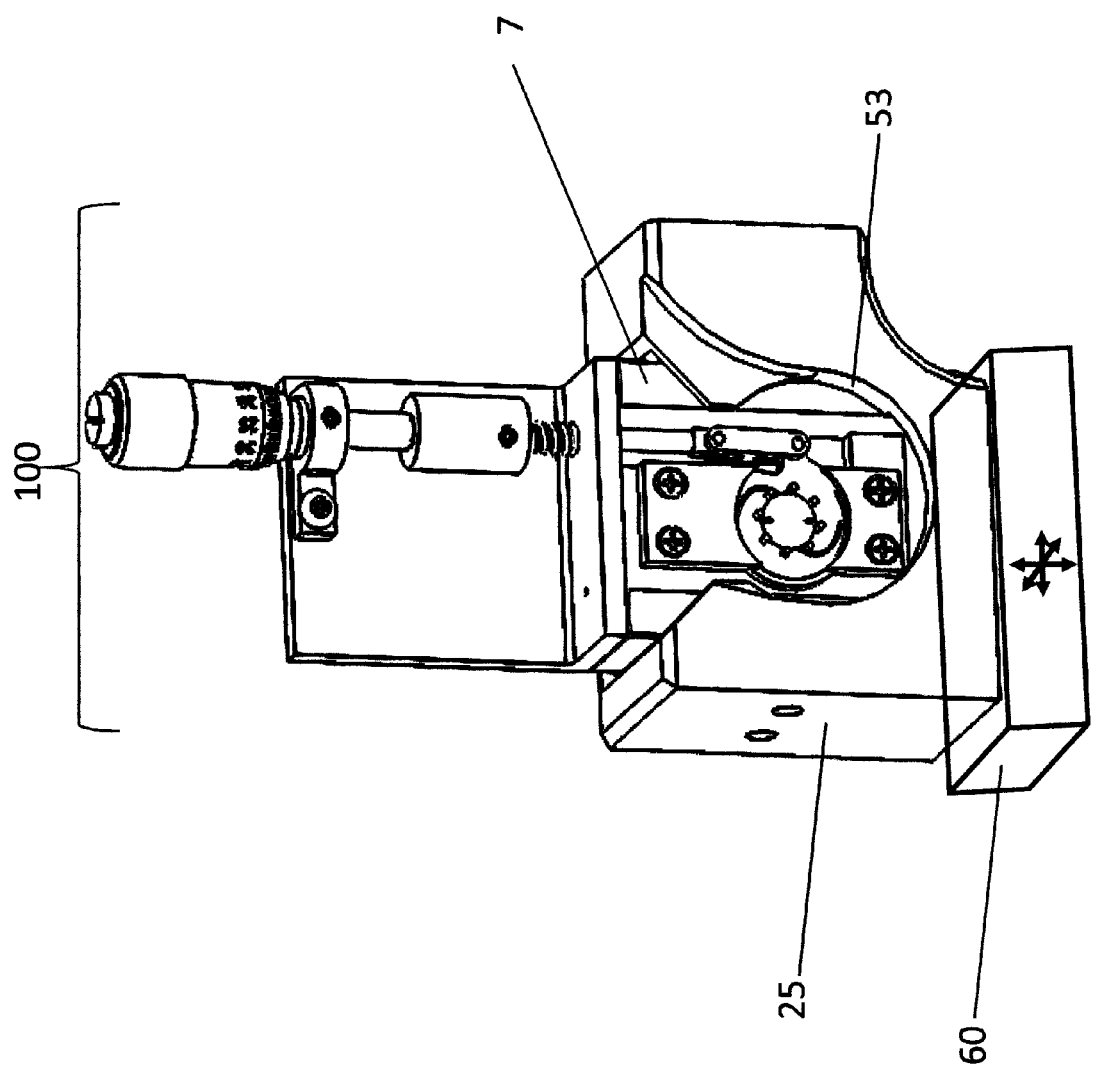
FIG. 7 shows a perspective view of a measurement cell and its contents mounted into the measurement cell receptacle of an angular error measuring instrument.

FIG. 3 to FIG. 7 show details of the rotatable IOL measurement fixture 100 of the present invention, and how it is used in the performance of methods of the present invention. FIG. 3 shows an exploded perspective view of the rotatable IOL measurement fixture 100 together with a measurement cell 7 used in a first embodiment of this invention. The measurement fixture 100 comprises a rotatable IOL holder 20 (shown assembled in FIG. 4) coupled to a drive assembly 30 which is coupled to an actuator 15 (shown assembled in FIG. 5 as 70). The rotatable IOL holder 20 is adapted to mount an IOL 22 and rotate it about its optical axis 29. FIG. 6 shows the assembled measurement fixture 100 with the IOL 22 installed and inserted into the opening 1 of measurement cell 7. FIG. 7 shows the measurement cell 7 and its contents mounted into a measurement cell receptacle 25 of an angular measuring instrument.

Referring to FIG. 3 and FIG. 4, the rotatable IOL holder 20 comprises a holder base 45, a holder base plate 8 and a holder base top 44 which can be constructed of one piece, or separate pieces which are permanently attached to each other. The holder base 45 includes a circular counter bore region 21 having a measurement aperture 32 to allow light to be transmitted through it when an IOL 22 is mounted into the rotatable IOL holder 20. A rotatable IOL receptacle 9 having a perimeter ledge 43 and a receptacle aperture 35 is installed in the circular counter bore region 21 of the holder base 45. The outer perimeter of the perimeter ledge 43 is designed to fit snuggly into the circular counter bore region 21 of holder base 45 so that the entire receptacle aperture 35 overlaps the measurement aperture 32.

The rotatable IOL receptacle 9 also includes lens centering pins 41 and a pivoting linkage receptacle 24. The lens centering pins 41 form a circular perimeter which surrounds an IOL lens 22 when mounted into the rotatable IOL receptacle 9. When mounting an IOL lens 22 into the rotatable IOL measurement fixture 100 the IOL haptics 31 are wrapped around the lens centering pins 41 to secure the IOL 22 in place without deforming the IOL 22.

With reference to FIG. 4, upper and lower retainers 13 and 17 are installed into the holder base 45 with the rotatable IOL receptacle mounted into the holder base using fasteners 4. The upper and lower retainers 13 and 17 include retainer lips 18 which align with the inner perimeter of the perimeter ledge 43 of the rotatable IOL receptacle 9 thus confining the rotatable IOL receptacle 9 to rotation only without changing the location its central axis when assembled.

Referring to FIG. 5, the assembled drive assembly 30 includes a pivoting linkage 10 shown as an H beam type structure, a connecting rod 12, a spring 5, and a coupler 14. The pivoting linkage 10 further comprises a lower pivot link receptacle 51 for interfacing to the pivoting linkage receptacle 24 of the rotatable IOL receptacle 9 and an upper pivot link receptacle 52 for interfacing to connecting rod 12. The pivoting linkage 10 further comprises a lower pivot link receptacle 51 for interfacing to the pivoting linkage receptacle 24 of the rotatable IOL receptacle 9 and an upper pivot link receptacle 52 for interfacing to connecting rod 12.

The coupler 14 also comprises a shaft recess 55 (See FIG. 3) which couples to a shaft 48 of an actuator 15. The actuator 15 (shown as a micrometer in the Figures) is designed so that the shaft 48 rotates as the actuator (micrometer) is rotated. The actuator 15 also includes an actuator mounting section 49 which remains stationary as the shaft 48 and the actuator 15 are rotated clockwise or counter clockwise as indicated by the curved arrow in FIG. 5. The exposed shaft length 48L shown by the double sided arrow changes as the actuator and shaft are rotated. The actuator 15 functions by rotating the actuator shaft 48 to change the shaft length about the stationary actuator mounting section.

During assembly of the rotatable IOL measurement fixture 100, the pivoting linkage 10 is attached to the pivoting linkage receptacle 24 of the rotating IOL receptacle 9 using the lower pivot link 19 shown in FIG. 3. The upper end of pivoting linkage 10 is attached to the pivoting linkage receptacle end 23 of connecting rod 12 via upper pivot link 11. The upper and lower pivot links 11 and 19 respectively can be comprised of press fit pins, rivets, machine screws or any other type of suitable type of fastener. The connecting rod 12 is passed through a guide hole 36 of holder base plate 8 and spring 5 is inserted over the end of the connecting rod 12 extending above the holder base plate 8 and adjacent to the holder base top 44 as shown in FIG. 6. The top end of connecting rod 12 (see FIG. 6) is inserted into a counter bore region (not shown) located at the bottom end of the coupler 14 with the spring 5 surrounding the exposed perimeter of the connecting rod 12. A fastener 6 is used to secure the top end of connecting rod 12 into the counter bore region of coupler 14 while the spring is mounted and compressed between the lower end face of coupler 14 and the upper surface of holder base plate 8.

The actuator mount 16 is shown mounted to the holder base top 44 in FIG. 6. The actuator mount 16 is attached to and aligned to the holder base top 44 by placing alignment pin 3 (shown in FIG. 3) into the bottom pin hole of actuator mount 16 (not shown) and into the alignment pin receptacle 47 of the holder base top 44 (shown in FIG. 4) and passing fastener 2 through fastener hole 54 (shown in FIG. 4) in actuator mount 16 and locking it into mounting hole 46 of holder base top 44 (shown in FIG. 4). The exposed end of the shaft 48 and the actuator mounting section 49 are inserted through mounting hole 56 of actuator mount 16 with the bottom end of the shaft 48 inserted into the shaft recess 55 located at the top end of coupler 14. When the actuator mounting section 49 is adjacent to the mounting hole 56 of the actuator mount 16 they are locked in place using fastener 57.

During operation the actuator shaft 48 rotates to change the height of the shaft 48. Referring to FIG. 6 it is observed that when the actuator shaft 48 is extended the connecting rod 12 is moved downward by the amount of extension. The compression of the spring 5 surrounding the connecting rod 12 causes an upward force on the coupler 14 which keeps the connecting rod 12 from continuing to move downward. When the actuator shaft 48 is moved upward, the spring 5 extends and moves the coupler 14 upward so that the top of the coupler 14 remains in contact with the bottom surface of actuator shaft 48. The pivoting linkage 10 attached to the bottom of connecting rod 12 converts the linear motion of the connecting rod 12 into rotational motion of the rotatable IOL receptacle 9.

Once assembled, the rotatable IOL measurement fixture 100 is installed in the measurement cell 7 as shown in FIG. 6. The measurement cell 7 is designed so that the assembled holder base 45 with IOL 22 installed fits snuggly into the measurement cell through opening 1 (see also FIG. 3) located at the top 58 of the measurement cell 7. This measurement cell 7 holds the IOL 22 mounted in the rotatable IOL holder 20 in place during measurement. It is also noted that in FIG. 6, the IOL 22 and IOL holder 20 are visible even though they are contained in the measurement cell 7 because the measurement cell 7 is made of a transparent material such as glass, as will now be explained.

Figure 6A:
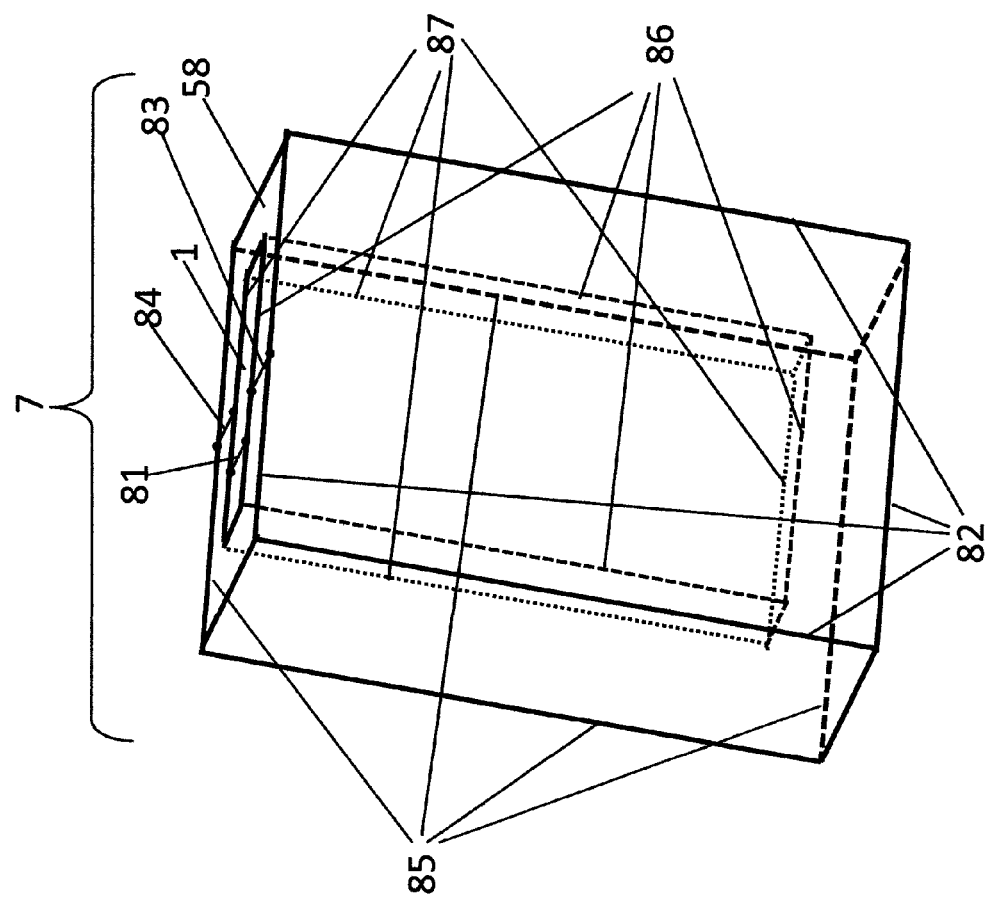
FIG. 6A shows a perspective view of a preferred measurement cell (cuvette)

A cuvette having a rectangular opening is an example of a preferred measurement cell 7, an example of which is shown in FIG. 6A. The preferred cuvette 7 is comprised of a pair of parallel optical flats having with a constant gap with a rectangular opening 1 between them. The front glass surface of the cuvette 7 is defined by the area bounded by the four edges of the glass surface indicated by numeral 82 in FIG. 6A. Similarly the back glass surface of the cuvette is defined by the area bounded by the 4 edges of the glass surface indicated by numeral 85. The cuvette opening front and back surfaces are defined by the area bounded by the 4 edges of the glass surfaces indicated by numerals 86 and 87 respectively. The cuvette opening thickness 81 is the thickness of the gap between the front and back optical flats of the cuvette having thicknesses 83 and 84 respectively. This configuration of a measurement cell minimizes wavefront deviations due to the presence of the measurement cell 7. The top surface of the measurement cell 7 is designed to be flat so that the bottom surface of the holder base plate 8 will rest on it and remain stationary during use.

Figure 8A:
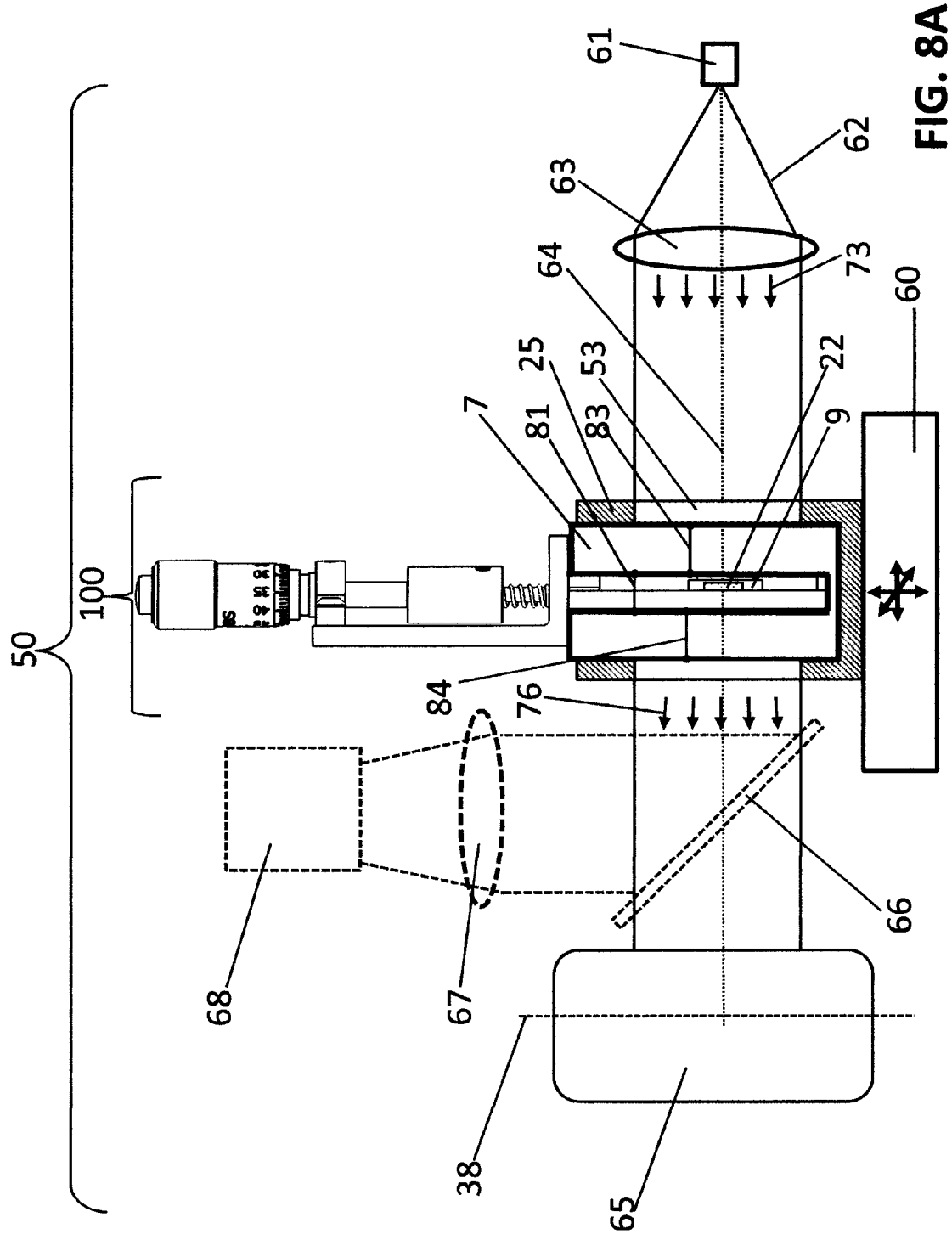
FIG. 8A shows a schematic diagram of an angular error measuring instrument with a measurement cell with a rotatable IOL measurement fixture installed in the measurement cell receptacle of the measuring instrument.
Figure 8B:
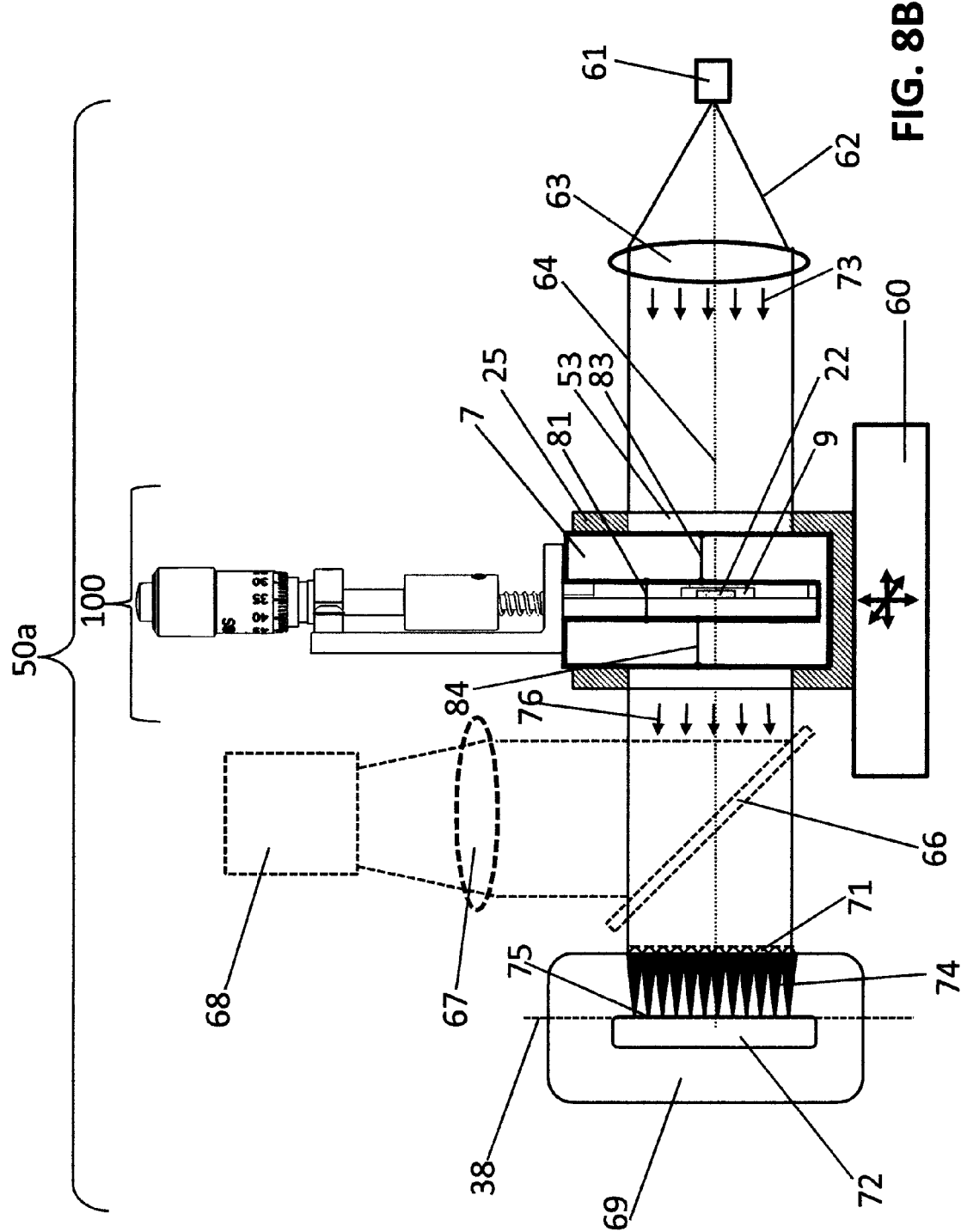
FIG. 8B shows a schematic diagram of an alternative angular error measuring instrument using a Shack-Hartmann wavefront sensor array with a measurement cell with a rotatable IOL measurement fixture installed in the measurement cell receptacle of the measuring instrument.

FIG. 8A and FIG. 8B show schematic block diagrams of different embodiments of angular error measuring instruments 50 and 50a including an IOL 22 mounted into a rotatable IOL measurement fixture 100 inserted into a measurement cell 7 and installed in the measurement cell receptacle 25 of the angular error measuring instrument 50 or 50a. The measurement fixture 100 is comprised of an actuator 15 coupled to a drive assembly 30 coupled to a rotatable intraocular lens holder 20 adapted to rotate the intraocular lens 22 about its optical axis 29 without changing the location of the optical axis 29. The IOL 22 is mounted into the rotatable IOL receptacle 9 of the rotatable intraocular lens holder 20 of the rotatable intraocular lens measurement fixture 100. After installing the rotatable IOL measurement fixture 100 into the measurement cell 7 it is inserted into a measurement cell receptacle 25 (see FIG. 7) of an angular error measuring instrument 50 shown in FIG. 8A or an alternate angular error measuring instrument 50a shown in FIG. 8B.

When mounting the IOL 22 into the rotatable IOL measurement fixture 100, the fiducial marks 28 are oriented so that they are within 45° of the angular orientation of the principal axis 38 of the angular error measuring instrument 50 or 50a. The orientation of the principal axis 38 is based on the alignment of the sensor 65 (FIG. 8A) or Shack-Hartmann wavefront sensor 69 (FIG. 8B) in the respective angular error measuring instruments 50 or 50a. The orientation of the principal axis 38 is shown as being vertical in FIG. 2, FIG. 8A and FIG. 8B.

A schematic block diagram of the first embodiment of an angular error measuring instrument 50 having a principal axis 38 defining a fixed coordinate system is shown in FIG. 8A. The angular error measuring instrument comprises a light source 61 which emits a diverging light beam 62. The light beam 62 is directed towards a lens 63 which shapes and directs directed light 73 through a measurement cell receptacle aperture 53 (shown in FIG. 7) of the measurement cell receptacle 25. The measurement cell receptacle aperture 53 is large enough so that all of the directed light 73 passes through the measurement cell receptacle aperture 53 and through the measurement cell 7 and the IOL 22. The light which is transmitted through the measurement cell receptacle aperture 53 is indicated by directed light 76. The arrows shown in the incoming directed light 73 and outgoing directed light 76 indicate the direction that the light is travelling at that location in the light beam. The measurement cell receptacle 25 is mounted onto a transport stage 60 which is used to adjust the position of the optical axis 29 (FIG. 1) of the IOL 22 with respect to the illumination axis 64 of the angular error measuring instrument 50. The transport stage 60 is preferably comprised of two or three transport stages (not shown), which travel along orthogonal axes and which can be either manually controlled or computer controlled.

The IOL 22 is mounted into the combination of a rotatable IOL measurement fixture 100, a cuvette 7 and the measurement cell receptacle 25 having a measurement cell receptacle aperture 53. Before performing measurements with the angular error measuring instrument 50, the position of the optical axis 29 of IOL 22 is adjusted to make it collinear with the illumination axis 64 of the angular error measuring instrument 50 using transport stage 60. The directed light 76 from lens 63 that passes through the IOL 22 and measurement cell 7 is incident onto a beam splitter 66. The beam splitter 66 sends a portion of the light which passed through the IOL 22 to a lens 67 which images the IOL 22 onto an optical feedback sensor 68. Another portion of the directed light 76 passes through the beam splitter 66 onto sensor 65. The angular error measuring instrument 50 also includes a processor (not shown) for processing data obtained from the sensor 65 to determine the angular error 39 (FIG. 2) in the placement of the fiducial marks 28 with respect to the true location of the meridional axis 42 of the intraocular lens 22. As used herein, "true location" with respect to the axis of an intraocular lens is meant to indicate the actual location of the meridional axis, in contrast to the location indicated by the fiducial marks 28, which may be in error in their indication. (The apparatus of the present invention is provided to measure such errors.) Also, other properties of the IOL 22 including spherical power, cylindrical power, spherical aberration, coma and other higher order aberrations can be determined from the data.

The optical feedback sensor 68 views the orientation of the fiducial marks 28 of IOL 22 with respect to a principal axis 38 of the angular error measuring instrument 50. The optical feedback sensor 68 can be a camera oriented so that its imager is aligned with the fixed coordinate system of the sensor 65. The angular error measuring instrument 50 may also include vision analysis software to process the camera image to determine the orientation of the fiducial marks 28 on the IOL 22 with respect to the principal axis 38 of the angular error measuring instrument 50. In some embodiments the actuator 15 can be comprised of a software controlled motor (not shown), which can be used to automatically rotate the intraocular lens 22 so that the fiducial marks 28 are properly aligned with and coincident with the principal axis 38 of the angular error measuring instrument 50 or 50a based on the vision analysis software determination of the orientation of the fiducial marks 28 on the IOL 22.

The optical feedback sensor 68 may also be the human eye. When the optical feedback sensor 68 is a human eye it is desirable to have a viewfinder which shows the orientation of a principal axis 38 of the angular measuring instrument 50 or 50a. The viewfinder will preferably have a reticle that is aligned with the principal axis of the angular measuring instrument 50 or 50a.

The angular error measuring instrument 50 shown in FIG. 8A is preferably a wavefront measuring instrument adapted to measure wavefront deviations due to the presence of the IOL 22 in the measurement cell 7. The wavefront measuring instrument 50 may be comprised of various types of measurement instruments including lateral shearing interferometers, curvature sensors, pyramid wavefront sensors, Focault knife-edge testers, Ronchi testers, and the Shack-Hartman Wavefront Sensor (shown as 50a in FIG. 8B).

A schematic block diagram of a second embodiment of an angular error measuring instrument 50a having a principal axis 38 defining a fixed coordinate system is shown in FIG. 8B. Labelled parts in FIG. 8A and FIG. 8B are the same with the exception that the sensor 65 shown in FIG. 8A has been replaced with a Shack-Hartmann wavefront sensor (SHWFS) 69 in FIG. 8B. The Shack-Hartmann wavefront sensor 69 is comprised of an array of closely spaced microlenses (referred to herein as a lenslet array 71) which focus light onto a sensor array 72. Light passing through the lenslet array 71 follow lenslet light paths 74 and are focused at the lenslet focal spots 75 onto different regions of sensor array 72. The purpose of the lenslets 71 is to probe the incoming wavefront, i.e., the portion of the directed light 76 which reaches the lenslet array 71. The lenslet array 71 focuses the incoming light into an array of focal spots 75 over the area of the sensor array 72. The location of the spots 75 depends on the orientation of the incoming wavefronts. As such, the lenslet array 71 translates changes in phase of the incoming light 76 into lateral shifts in the position of the focal spots 75 on the sensor array 72. Light passing through each of the lenslets 71 follows the corresponding lenslet light paths 74 and is focused onto different regions of the sensor array 72 which are dependent upon the wavefront of the light 76 that has passed through the IOL 22.

The sensor array 72 is preferable a 2 dimensional CCD or CMOS imager. The movement of the lenslet focused light 74 is analyzed by the Shack-Hartmann wavefront sensor 69 to determine the optical properties of the light directed through the IOL 22. The amount of shift of each focal spot 75 due to the presence of the IOL 22 may then be used to find wavefront orientation at each respective lenslet 71 location. From this information, the overall wavefront can then be reconstructed and the orientation of the steep and shallow meridian 42 axes of IOL 22 can be determined.

Figure 2:
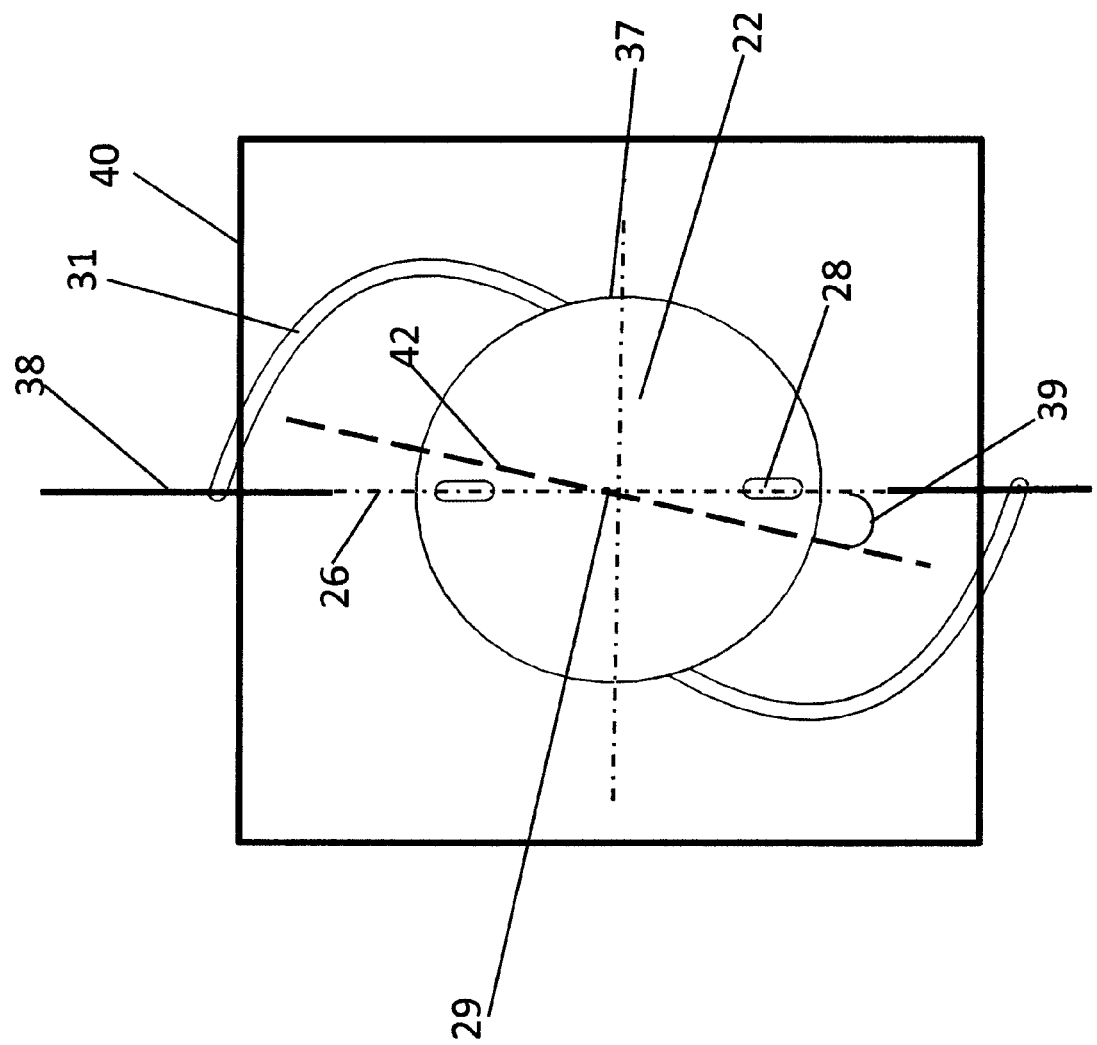
FIG. 2 shows a plan view of a toric IOL as it appears in the measurement region of a wavefront sensor when its fiducial marks are aligned with the principal axis of the wavefront sensor.

As an example, the measurement region of a camera used as the optical feedback sensor 68 is the area inside the box indicating the wavefront sensor active area 40 as shown in FIG. 2. The principal axis 38 of the wavefront sensor array 72 is aligned with the vertical direction of the camera 68. The orientation of the IOL 22 in the measurement fixture 100 is adjusted so that its fiducial marks 28 are aligned with the principal axis 38 of the wavefront measuring instrument 50a. This is readily observed by viewing the camera image and can be improved with vision analysis software. When the wavefront sensor data is processed after alignment of the fiducial marks 28 on the IOL 22 with the principal axis of the wavefront sensor 38, a non-zero reading measurement for the shallow meridian cylinder axis 42 as calculated by the wavefront sensor 69 indicates the angular misalignment 39 between the fiducial marks 28 and the true meridional cylinder axis 42 of the IOL 22.

Further details on the use of a Shack-Hartman wavefront sensor in optical metrology may be found in "Application of Shack-Hartmann wavefront sensing technology to transmissive optic metrology," R. R. Rammage et al., Proc. SPIE 4779, Advanced Characterization Techniques for Optical, Semiconductor, and Data Storage Components, 161. One may also refer to U.S. Pat. No. 5,936,720, "Beam characterization by wavefront sensor," and U.S. Pat. No. 6,130,419, "Fixed mount wavefront sensor," the disclosures of which are incorporated herein by reference.

The accuracy of the placement of the fiducial marks on the face of an IOL 22 is quantified by correlating the image of the fiducial marks 28 with the measured optical properties of the IOL 22. The fiducial mark 28 accuracy data can be used to reject an IOL 22 for use in cataract surgery due to an excessive misalignment between the fiducial marks 28 and the shallow meridian axis 42 of the IOL 22.

Usually when making measurements with a Shack-Hartmann wavefront sensor 69, a reference wavefront measurement is first measured which includes the measurement cell 7 without the sample (IOL 22) being present. Any wavefront deviations from the measurement cell 7 can then be referenced out of the system. Using the wavefront measurement apparatus 50a, the optical power, the physical dimensions and optical aberrations of an IOL 22 or other lens including a contact lens may be measured. Optical power and optical aberrations define the optical performance parameters of a lens. Examples of optical aberrations are spherical, chromatic, astigmatism, coma, field curvature, distortion and others. In optics, the term waveform is used to denote the amplitude and phase of a light beam as a function of time and position. The wavefront of a light beam is defined as the locus of points having the same optical phase. The wavefront of a light beam can be defined as the virtual surface defined by the points on all possible rays in a light beam having equal optical path length from a spatially coherent source. As examples the wavefront of light emanating from a point light source is a sphere, and the wavefront created by a point source mounted one focal length away from an ideal collimating lens is a plane. The focal lengths and optical powers of the shallow and meridional axes of the lens may be calculated from data provided by a Shack-Hartmann wavefront sensor as described in the article, "Measurement of lens focal length using multi-curvature analysis of Shack-Hartmann wavefront data", Daniel R. Neal, James Copland, David A. Neal, Daniel M. Topa, Phillip Riera, Proc. of SPIE Vol. 5523, pp. 243-255, (2004).

This invention also allows for the measurement of the IOL 22 in various types of environments including vacuum, partial vacuum and fluid environments. Typical fluid environments useful for the measurement of IOLs 22 include saline solution, deionized water, or air. As an example, being able to compare wet and dry IOL 22 measurement data can be important in the development and manufacture of IOLs 22. Using the measurement cell 7 and the rotatable IOL measurement fixture 100, the IOL 22 can be measured at the same location mounted in the cuvette with different fluids being present, without changing the rotational alignment of the IOL 22. As shown in FIG. 3 and FIG. 4, the holder base plate 8 of the rotatable IOL holder 20 also includes a fluid port 33 for inserting and extracting fluids, thus allowing the user to change the fluid environment while the IOL 22 is installed in the measurement environment. Being able to maintain the same rotational alignment between different measurement equipment and different states of measurement environments is a key advance allowed by this invention. Optionally, the IOL 22 can be removed from the saline environment and re-mounted into a new or the same measurement system to be measured in air. Wet and dry measurement data can be compared without requiring compensation for realignment of the sample.

The effect of changes in temperature on the performance of IOLs 22 is another parameter of potential interest. As shown in FIGS. 3 and 4, the holder base plate 8 of the rotatable IOL holder 20 includes a thermocouple port 34 for inserting a thermocouple probe (not shown) into the measurement cell 7 so that the temperature can be monitored. The measurement cell receptacle 25 (see FIG. 7) may also include heaters and coolers such as thermoelectric elements (not shown) to control the temperature of the fluid environment in the measurement cell 7.

Figure 9:
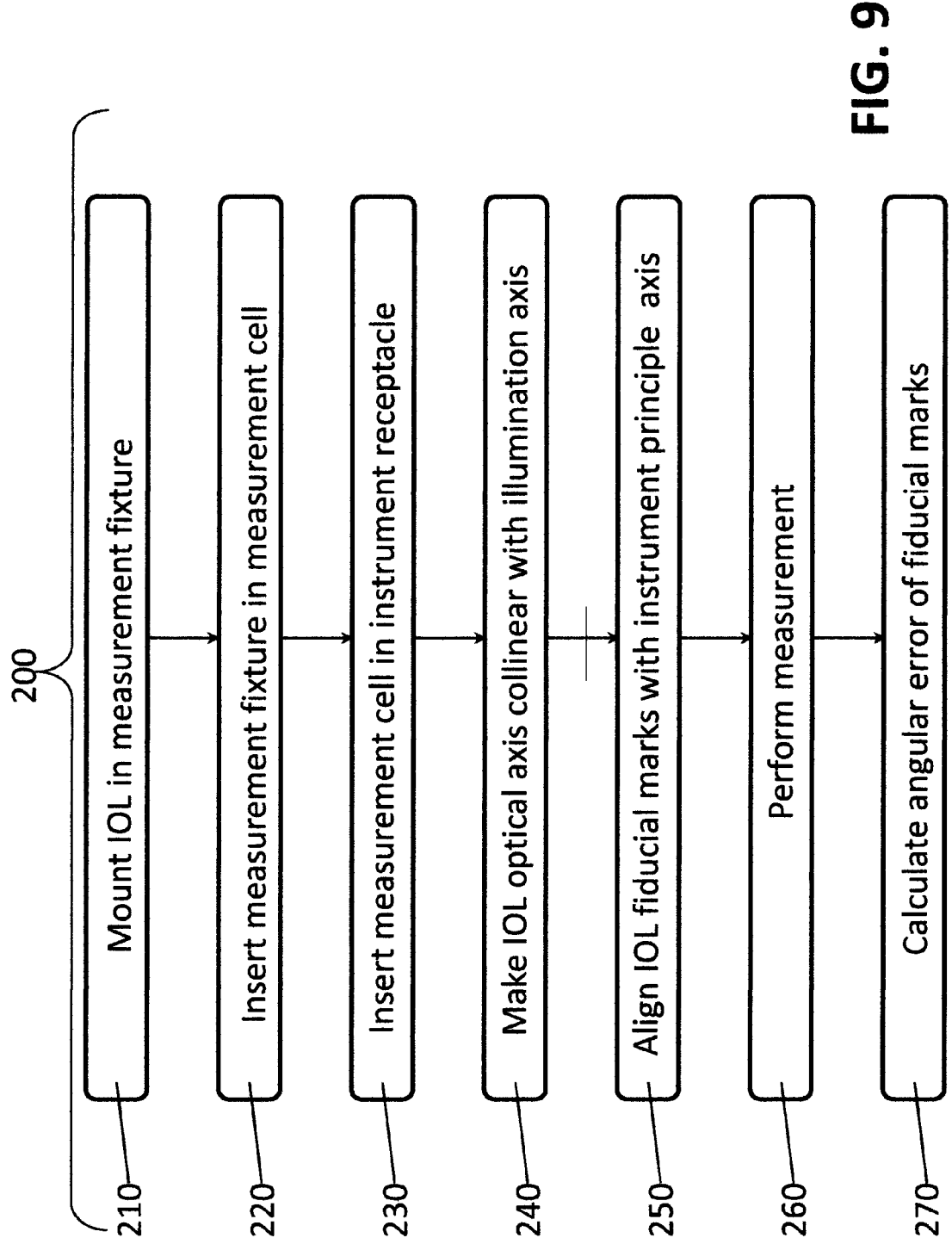
FIG. 9 shows a flow chart outlining the steps used to measure the angular error in the placement of fiducial marks on a toric IOL with respect to the true location of the meridional axis of the IOL according to an embodiment of the invention.

FIG. 9 is a flow chart 200 showing the steps performed in carrying out a method for determining the angular error 39 in the placement of fiducial marks 28 on a toric intraocular lens 22 with respect to the true location of a meridional axis 42 of the intraocular lens 22, said fiducial marks 28 defining an estimate of the angular orientation of the shallow meridional axis 26 of the intraocular lens 22 according to an embodiment of this invention. The first step 210 shown in FIG. 9 is to mount the IOL 22 into the rotatable intraocular lens holder 20 of a provided measurement fixture 100. The measurement fixture 100 is comprised of an actuator 15 coupled to a drive assembly 30 coupled to the rotatable intraocular lens holder 20, and the rotatable intraocular lens holder 20 is adapted to rotate the intraocular lens 22 about its optical axis 29 without changing the location of the optical axis 29. Step 210 is followed by step 220 in which the measurement fixture 100 containing the mounted IOL 22 is inserted into a measurement cell 7 (preferably a cuvette) containing a fluid environment.

Step 220 is followed by step 230 in which the measurement cell 7 and its contents are inserted into the measurement cell receptacle 25 of a provided angular error measuring instrument 50 or 50a. The provided angular error measuring instrument 50 or 50a has an illumination axis 64 and a principal axis 38. The angular error measuring instrument 50 or 50a comprises a light source 61, a measurement cell receptacle 25 located in a measurement region of the instrument and a sensor 65. The light source 61 is configured to emit a beam of light 62 directed along the illumination axis 64 and passing through the optical measurement cell receptacle 25 and its contents and onto the sensor 65. It is to be understood that the configuration of the angular error measuring instrument 50 or 50a may vary from that shown in FIGS. 8A and 8B, such that the order of steps 210-230 also vary accordingly.

Step 230 is followed by step 240 in which the optical axis 29 of the IOL 22 is made to be collinear with the illumination axis 64 of the angular error measuring instrument 50 or 50a. This is performed by adjusting the location of the optical axis 29 of the IOL 22 by moving the transport stages 60 until the optical axis 29 of the IOL 22 is coincident with the illumination axis 64 of the angular error measuring instrument 50 or 50a. Step 240 is followed by step 250 in which the fiducial marks 28 on the IOL 22 are aligned with the principal axis 38 of the angular error measuring instrument 50 or 50a. This is performed by adjusting the actuator 15 to rotate the intraocular lens 22 about its optical axis 29 so that the fiducial marks on the IOL 22 are aligned with the principal axis 38 of the angular error measuring instrument 50 or 50a.

Step 250 is followed by step 260 in which the angular error measuring instrument 50 or 50a performs a measurement to obtain measurement data from the sensor 65 or 69. During this step, the sensor 65 or 69 detects the changes in the path of the light beams 73 and 76 as they pass through the IOL 22. Step 260 is followed by step 270 in which calculations are performed using the sensor data to determine the angular error 39 in the placement of the fiducial marks 28 on the IOL 22 with respect to the true location of the meridional axis 42 of the IOL 22 from the measurement data.

The angular error measuring instrument 50 or 50a described in the steps of performing this invention with reference to FIG. 9 may be a wavefront sensor adapted to measure wavefront deviations due to the presence of the intraocular lens. More particularly the wavefront sensor may be a Shack-Hartmann wavefront sensor 69. It is to be understood that other types of wavefront sensors may also be utilized in the apparatuses shown in FIG. 8A and FIG. 8B. When using other wavefront sensors, lenslet array 71 may be replaced with another type of element. As an example in the case of a lateral shearing type interferometer setup, lenslet array 71 may be replaced with a birefringent crystal.

The measurement fixture 100 allows one to insert an IOL 22 into a wet or dry cuvette 7. In addition the measurement fixture 100 allows measurements to be made without the use of the cuvette by inserting the measurement fixture 100 directly into the measurement cell receptacle 25.

The invention has been described in detail with particular reference to certain example embodiments thereof, but it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

PARTS LIST

1 Measurement Cell Opening
2 Fastener
3 Alignment Pin
4 Fastener
5 Spring
6 Fastener
7 Measurement Cell
8 Holder Base Plate
9 Rotatable IOL Receptacle
10 Pivoting Linkage
11 Upper Pivot Link
12 Connecting Rod
13 Upper Retainer
14 Coupler
15 Actuator
16 Actuator Mount
17 Lower Retainer
18 Retainer Lip 19 Lower Pivot Link
20 Rotatable IOL holder
21 Counter Bore Region
22 Toric IOL
23 Pivoting Linkage Receptacle end
24 Pivoting Linkage Receptacle
25 Measurement Cell Receptacle
26 Marked Shallow Meridian Axis
27 Expected Steep Meridian Axis
28 Fiducial Mark
29 Optical Axis
30 Drive Assembly
31 Haptic
32 Measurement Aperture
33 Fluid Port
34 Thermocouple Port
35 Receptacle Aperture
36 Guide Hole
37 Outer Diameter
38 Principal Axis
39 Angular Error
40 Wavefront Sensor Active Area
41 Lens Centering Pins
42 True Shallow Meridian Axis
43 Perimeter Ledge
44 Holder Base Top
45 Holder Base
46 Mounting Hole
47 Alignment Pin Receptacle
48 Shaft
48L Exposed Shaft Length
49 Actuator Mounting Section
50 Angular Error Measuring Instrument
50a Alternate Angular Error Measuring Instrument
51 Lower Pivot Link Receptacle
52 Upper Pivot Link Receptacle
53 Measurement Cell Receptacle Aperture
54 Fastener Hole
55 Shaft Recess
56 Mounting Hole
57 Fastener
58 Measurement Cell Top Surface
60 Transport Stage
61 Light Source
62 Beam of Light
63 Lens
64 Illumination Axis
65 Sensor
66 Beam Splitter
67 Lens
68 Optical Feedback Sensor
69 Shack-Hartmann Wavefront Sensor
70 Drive Assembly with Actuator
71 Lenslet Array
72 Sensor Array
73 Directed Light
74 Lenslet Light Paths
75 Lenslet Focal Spots
76 Directed Light
81 Cuvette Opening Thickness
82 Cuvette Front Surface
83 Cuvette Front Glass Thickness
84 Cuvette Back Glass Thickness
85 Cuvette Back Surface
86 Cuvette Opening Front Surface
87 Cuvette Opening Back Surface
100 Rotatable IOL Measurement Fixture
200 Measurement Procedure
210 Step
220 Step
230 Step
240 Step
250 Step
260 Step
270 Step

We claim:

1. An apparatus for determining the angular error in the placement of fiducial marks on an intraocular lens with respect to the true location of a meridional axis of the intraocular lens, said fiducial marks defining an estimate of the angular orientation of the meridional axis of the intraocular lens, the apparatus comprising:
   a. a rotatable intraocular lens holder adapted to mount the intraocular lens and rotate the intraocular lens about its optical axis;
   b. a drive assembly coupled to the rotatable intraocular lens holder adapted to rotate the intraocular lens mounted in the rotatable intraocular lens holder without changing the location of the optical axis;
   c. an optical measurement cell configured to hold the intraocular lens mounted in the rotatable intraocular lens holder;
   d. an optical measurement cell receptacle configured to receive the optical measurement cell and its contents;
   e. a wavefront measuring instrument having a principal axis defining a fixed coordinate system; the wavefront measuring instrument further comprising a light source and a wavefront sensor; the light source being configured to emit a beam of light directed along an illumination axis passing through the optical measurement cell receptacle and its contents and onto the wavefront sensor, the wavefront measuring instrument being adapted to measure wavefront deviations due to the presence of the intraocular lens;
   f. an optical feedback sensor configured to view the orientation of the fiducial marks on the intraocular lens with respect to the principal axis of the wavefront measuring instrument;
   g. an actuator coupled to the drive assembly and operable to rotate the intraocular lens about its optical axis so that the fiducial marks of the intraocular lens are aligned with the principal axis of the wavefront measuring instrument using the optical feedback sensor; and
   h. a processor including an algorithm executable to process the wavefront deviations due to the presence of the intraocular lens in the optical measurement cell receptacle and calculate the angular error in the placement of the fiducial marks with respect to the true location of the meridional axis of the intraocular lens.

2. The apparatus of claim 1, wherein the wavefront sensor is a Shack-Hartmann wavefront sensor.

3. The apparatus of claim 1, wherein the optical measurement cell contains a fluid environment.

4. The apparatus of claim 3, wherein the fluid environment is comprised of one of saline solution, deionized water, or air.

5. The apparatus of claim 1, wherein the optical feedback sensor comprises a viewfinder comprising a reticle aligned with the principal axis of the wavefront measuring instrument.

6. The apparatus of claim 1, wherein the optical feedback sensor is a camera which images the surface of the intraocular lens.

7. The apparatus of claim 6, further comprising vision analysis software to process a camera image to determine the orientation of the fiducial marks on the intraocular lens with respect to the principal axis of the wavefront measuring instrument.

8. The apparatus of claim 7, further comprising a software controlled actuator coupled to the drive assembly to automatically align the fiducial marks on the intraocular lens to be coincident with the principal axis of the wavefront measuring instrument.

9. The apparatus of claim 1, wherein the measurement cell receptacle further comprises at least one transport stage configured to adjust the position of the optical axis of the intraocular lens in the measurement cell.

10. The apparatus of claim 1 in which the processor also determines at least one other property of the intraocular lens selected from spherical power, cylindrical power, spherical aberration, coma and other higher order aberrations.

11. A method for determining the angular error in the placement of fiducial marks on an intraocular lens with respect to the true location of a meridional axis of the intraocular lens, said fiducial marks defining an estimate of the angular orientation of the meridional axis of the intraocular lens, comprising the steps of:
 a. providing a rotatable intraocular lens measurement fixture comprising an actuator coupled to a drive assembly coupled to a rotatable intraocular lens holder adapted to rotate the intraocular lens about its optical axis without changing the location of the optical axis;
 b. mounting the intraocular lens into the rotatable intraocular lens holder of the rotatable intraocular lens measurement fixture;
 c. inserting the intraocular lens mounted in the rotatable intraocular lens measurement fixture into a measurement cell;
 d. providing a wavefront measuring instrument having a principal axis defining a fixed coordinate system and comprising a light source, a measurement cell receptacle located in a measurement region of the instrument and a sensor, the light source being configured to emit a beam of light directed along an illumination axis passing through the optical measurement cell receptacle and its contents and onto the sensor, the wavefront measuring instrument being adapted to measure wavefront deviations due to the presence of the intraocular lens;
 e. inserting the measurement cell into the measurement cell receptacle of the wavefront measuring instrument;
 f. adjusting the location of the optical axis of the intraocular lens in the measurement cell so that it is collinear with the illumination axis of the wavefront measuring instrument;
 g. detecting the orientation of the fiducial marks on the lens with respect to the principal axis of the wavefront measuring instrument and adjusting the actuator to rotate the lens so that the fiducial marks on the lens are aligned with the principal axis of the wavefront measuring instrument if they are not in alignment;
 h. obtaining measurement data by performing a measurement of the wavefront deviations due to the presence of the intraocular lens using the wavefront measuring instrument; and
 i. calculating the angular error in the placement of the fiducial marks on the intraocular lens with respect to the true location of the meridional axis of the intraocular lens from the measurement data.

12. The method of claim 11, wherein the optical measurement cell contains a fluid environment.

13. The method of claim 12, wherein the fluid environment is comprised of one of saline solution, deionized water, or air.

14. The method of claim 11, wherein the sensor is a Shack-Hartmann wavefront sensor.

15. The method of claim 11, wherein the step of rotating the intraocular lens so that the fiducial marks on the intraocular lens are aligned with the principal axis of the wavefront measuring instrument is performed using an optical feedback sensor.

16. The method of claim 15, wherein the step of adjusting the location of the optical axis of the intraocular lens so that it is collinear with the illumination axis of the wavefront measuring instrument is performed using the optical feedback sensor.

17. The method of claim 16, wherein the optical feedback sensor is a camera which images the surface of the intraocular lens.

18. The method of claim 17, wherein a camera image is processed using vision analysis software to determine the orientation of the fiducial marks on the intraocular lens with respect to the principal axis of the wavefront measuring instrument from the camera image, and the actuator is software controlled to automatically align the fiducial marks on the intraocular lens with the principal axis of the wavefront measuring instrument.

19. The method of claim 16, wherein the step of adjusting the optical axis of the intraocular lens so that it is collinear with the illumination axis of the wavefront measuring instrument is performed using vision analysis software.

20. The method of claim 11, wherein the step of rotating the intraocular lens so that the fiducial marks on the intraocular lens are aligned with the principal axis of the wavefront measuring instrument is performed by a human.

21. The method of claim 11, in which at least one other property of the intraocular lens selected from spherical power, cylindrical power, spherical aberration, coma and other higher order aberrations is calculated from the measurement data.

22. An apparatus for determining the angular error in the placement of fiducial marks on an intraocular lens with respect to the true location of a meridional axis of the intraocular lens, said fiducial marks defining an estimate of the angular orientation of a meridional axis of the intraocular lens, the apparatus comprising:
 a. a rotatable intraocular lens holder adapted to mount the intraocular lens and rotate the intraocular lens about its optical axis;
 b. a drive assembly coupled to the rotatable intraocular lens holder adapted to rotate the intraocular lens mounted in the rotatable intraocular lens holder without changing the location of the optical axis;
 c. an optical measurement cell configured to hold the intraocular lens mounted in the rotatable intraocular lens holder;
 d. an optical measurement cell receptacle configured to receive the optical measurement cell and its contents;
 e. an angular error measuring instrument having a principal axis defining a fixed coordinate system, the angular error measuring instrument further comprising a light source and a first sensor, the light source being configured to emit a beam of light directed along an illumination axis passing through the optical measurement cell receptacle and its contents and onto the first sensor;

f. an optical feedback sensor configured to view the orientation of the fiducial marks on the intraocular lens with respect to the principal axis of the angular error measuring instrument;
g. an actuator coupled to the drive assembly and operable to rotate the intraocular lens about its optical axis so that the fiducial marks of the intraocular lens are coincident with the principal axis of the angular error measuring instrument using the optical feedback sensor; and
h. a processor including an algorithm executable to process data obtained from the first sensor to determine the angular error in the placement of the fiducial marks with respect to the true location of the meridional axis of the intraocular lens.

* * * * *